Figure 1:
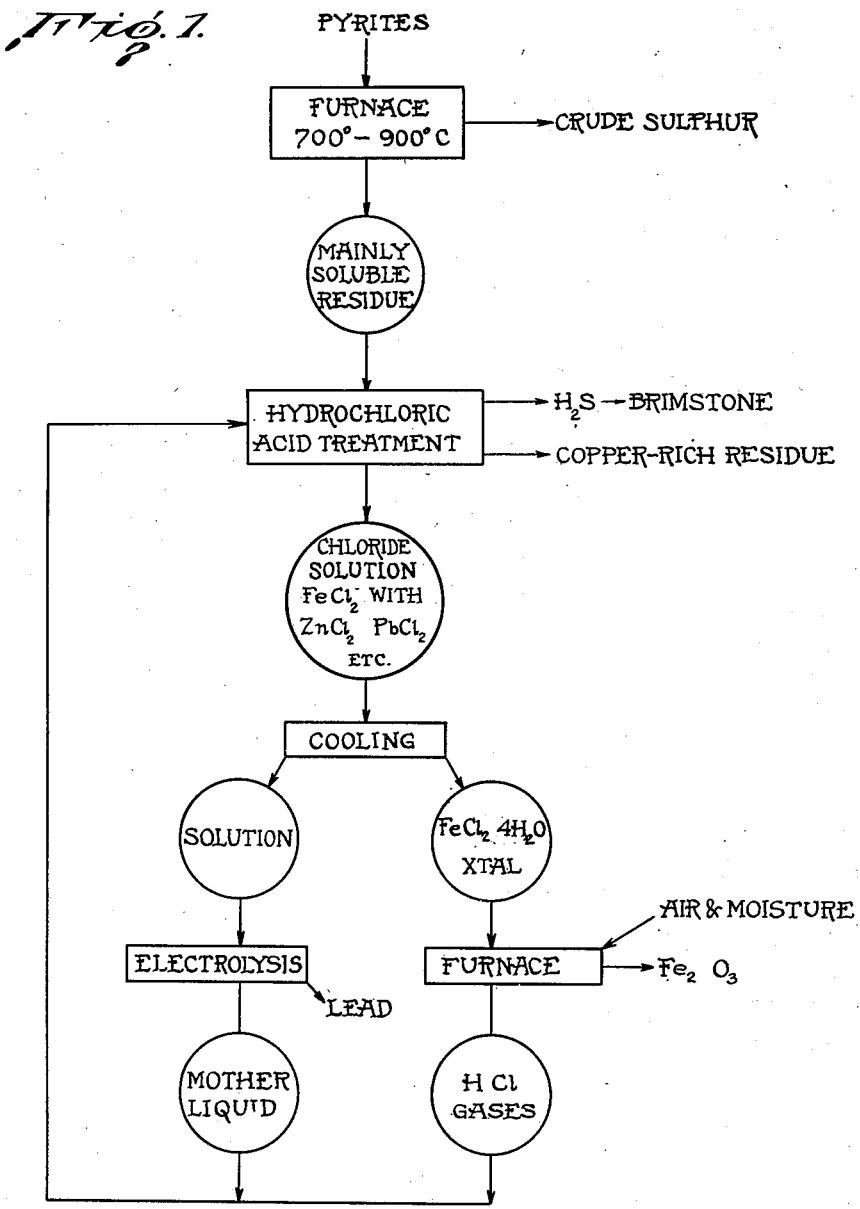

Nov. 13, 1934.　　　　S. I. LEVY　　　　1,980,809

PRODUCTION OF FERRIC OXIDE AND OTHER METAL VALUES FROM PYRITES

Filed March 5, 1928　　　2 Sheets-Sheet 1

INVENTOR
Stanley I. Levy,
BY
ATTORNEYS

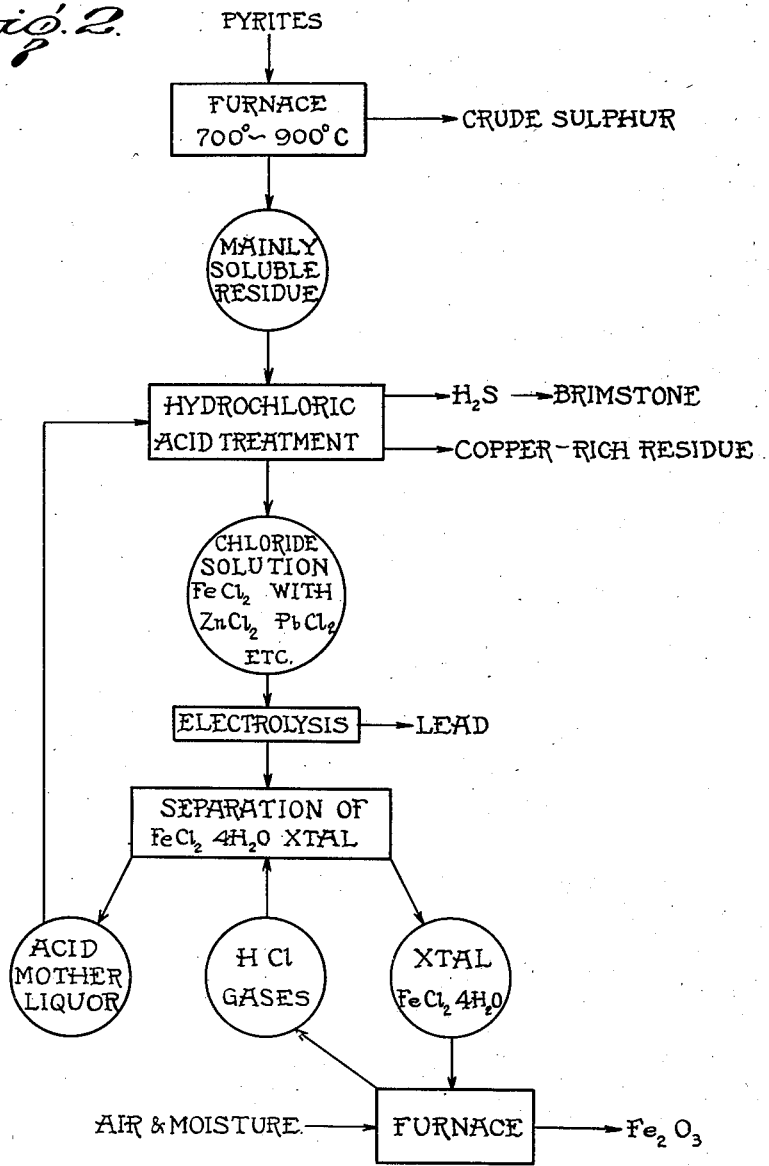

Patented Nov. 13, 1934

1,980,809

UNITED STATES PATENT OFFICE 1,980,809

PRODUCTION OF FERRIC OXIDE AND OTHER METAL VALUES FROM PYRITES

Stanley Isaac Levy, London, England

Application March 5, 1928, Serial No. 259,317
In Great Britain February 10, 1928

5 Claims. (Cl. 23—200)

This invention relates to the treatment of iron pyrites.

In its broad aspect the invention contemplates (1) the treatment of pyrites to bring it into the form of a "mainly soluble" residue and to obtain sulphur, (2) the treatment of this residue with hydrochloric acid to provide a copper-rich residue, sulphuretted hydrogen, and a chloride solution, and (3) the subsequent treatment of this chloride solution to form pure ferric oxide and hydrogen chloride adapted for use as hydrochloric acid in the treatment of further quantities of "mainly soluble" residue. The invention contemplates also the removal of lead from the chloride solution; and the recovery of zinc by concentration in the chloride liquor.

It is well known that if iron pyrites, which consists chiefly of iron disulphide associated with quantities of copper, zinc and lead sulphides, with some insoluble siliceous matter, and possibly a little arsenic, be heated to 700°-900° C. in the absence of air, a considerable proportion of the sulphur present is driven off, chiefly as elemental sulphur, and to a smaller extent as sulphur dioxide, and on this knowledge has been based a suggested method of obtaining elemental sulphur. The sulphur so obtained, however, is by no means pure, and amounts in quantity only to about two-fifths of the sulphur present in the pyrites. The residue remaining after such treatment contains usually 52-54% of iron with 35-37% of sulphur, and all the other metals present in the original pyrites; any arsenic originally present is driven off and the residue is practically free from arsenic. This residue is referred to herein as the "mainly soluble" residue. Hitherto it has been thought that this residue could be usefully treated only by burning it in air to produce ferric oxide and sulphur dioxide.

As a result of experimental research I have now found that if this residue be treated with hydrochloric acid solution, containing for example 20-24% of the acid by weight, a vigorous reaction sets in, which is completed by heating to 100° C. About 90% of the iron present, together with practically the whole of the lead present, passes into solution as chloride; and the equivalent quantity of sulphur is disengaged as sulphuretted hydrogen, from which, by burning with a limited quantity of air in a Claus or other kiln in known manner, pure sulphur is obtained. The whole of the copper, together with the insoluble matter, and the remainder of the iron and sulphur, is left in the residue, which may amount to 10-18 parts per 100 parts of pyrites treated, according to the duration and intensity of the acid treatment. This residue is hereinafter referred to as the "copper-rich" residue. The zinc is partly dissolved, and partly left in the residue.

Thus, if the mainly soluble residue and acid solution be left to stand for several hours without heating, the residue may be 40 parts per 100 parts of pyrites treated. If it be heated to 80° for two hours, the residue may be 25 parts. Under these conditions practically the whole of the zinc remains in the residue. If the mixture be boiled for three or four hours, the residue may be 10-18 parts per 100 parts of pyrites, and about two-thirds of the zinc goes into the solution. The amount of acid used may be in excess of that chemically required, but to obtain a low acid concentration in the finished solution, I employ 65-75 parts of acid as HCl per 100 parts of the "mainly soluble" residue. Any eventual excess of acid may be neutralized by adding the necessary quantity of "mainly soluble" residue to the boiling mixture.

A typical "copper-rich" residue will contain copper 8-12%, zinc 3-6%, sulphur 35-40%, iron 25-30%, insoluble matter 8-15%; but the composition naturally varies with the composition of the original pyrites and the duration and extent of the treatment. The solution contains ferrous chloride with the lead also in the form of chloride.

After the treatment of the "mainly soluble" residue with hydrochloric acid, the "copper-rich" residue is removed from the solution by filtration in a filter press, or in a vacuum or pressure filter, and the faintly acid solution of the metallic chlorides is subjected to electrolysis for the recovery of the lead. A very low voltage only, say one half to one volt, is required. The cathode is an iron plate, on which the lead is deposited in a spongy condition. The spongy lead is removed periodically and compressed to free it from adherent solution; it may be washed and sold directly as crude metal, or melted up and refined in the usual way. The anode may be a rod or plate of carbon or other inert material, which may be immersed in a common salt solution contained in a porous vessel, in which case chlorine is evolved and may be liquefied or converted into bleaching powder etc., in known manner; or the anode may be an iron plate, in which case a quantity of iron equivalent to the lead deposited, and to the small amount of hydrogen formed at the cathode, is taken into the solution. The recovery of lead is very high, and amounts to 80-90% of that present in the original pyrites.

The solution now contains only ferrous chloride with zinc chloride. It may be evaporated down directly for separation of ferrous chloride, leaving the zinc associated with only a small part of the iron in solution. I prefer, however, to make use of the gaseous hydrochloric acid subsequently recovered from the ferrous chloride, as described below, to obtain the separation of ferrous chloride crystals from the solution. The hydrochloric acid gas may be utilized for this purpose in two ways. In the first which is illustrated in the flow-sheet Fig. 1, the chloride solution is used, after the separation of the lead, as the vehicle in which a further quantity of the "mainly soluble" residue is treated with HCl, the liquor being circulated through suitable absorbers to take up the hydrochloric acid gas required to react with the further quantity of "mainly soluble" residue. In this way a further quantity of ferrous chloride is brought into the solution, the quantity being so chosen that the hot liquor at the end of the reaction is saturated with ferrous chloride at 100° C., to the extent of about 90%. The insoluble "copper-rich" residue is filtered at 100° C. or over, and washed with a little boiling water, the washings being reserved to add to the liquor for the next charge; the hot filtrate is then cooled, when ferrous chloride separates in the form of the crystalline tetrahydrate, $FeCl_2, 4H_2O$. The cooling may be effected by means of towers, rockers or cooling tanks or vessels in known manner. The crystals are removed from the mother liquor in any suitable manner and washed with a little saturated ferrous chloride solution previously prepared, to remove the adherent mother liquor, which contains zinc chloride and possibly lead chloride. It will be seen that a quantity of water, namely 4 molecules for each molecule of ferrous chloride, is removed from the cycle with the crystals, and that therefore this quantity may be added for the next operation in the form of washings from the residues, crystals etc., of a previous operation; in this way the water in the cycle is kept constant, whilst effective washing is carried out. The solubilities of ferrous chloride at different temperatures are such that a solution nearly saturated with ferrous chloride at 100° C. deposits about one half of the ferrous chloride it contains when cooled to 20° C., and are therefore almost ideal for this operation.

The water contained in the crystals must be driven off by evaporation, but the quantity is small, about 35% of the weight of the crystals only, and the operation is easily and cheaply effected by use of waste heat.

By repeated employment of the mother liquor, the concentration of zinc rapidly rises; when this is high enough to make it difficult to avoid loss of zinc in the crystals, say at about 80-100 grams of zinc per litre, or more, the liquor is withdrawn from the cycle, and concentrated by heating or otherwise until the bulk of the remaining ferrous chloride separates on cooling, leaving the zinc in solution with relatively little iron, from which it is easily separated by known methods. In this way the zinc which goes into solution when the "mainly soluble" residue is treated with hydrochloric acid is easily and cheaply recovered.

The concentration of lead in the solution may be varied in this way at the same time, if electrolysis be not effected at each cycle. In this case, however, the limit of solubility of the lead chloride in saturated ferrous chloride, equivalent to a lead content of about 15 grams per litre, is soon reached, so that electrolysis of the cooled mother liquor should be effected at every second or third repetition of the cycle, according to the lead content of the original pyrites.

In the second way of effecting the separation of ferrous chloride crystals illustrated in the flow sheet Fig. 2, the liquor after treatment of the "mainly soluble" residue with hydrochloric acid, is filtered from the "copper-rich" residue, and the lead removed by electrolysis. The liquor is then treated with hydrochloric acid gas recovered from ferrous chloride previously obtained; the gas dissolves very readily, causing immediate separation of crystalline ferrous chloride. The absorption vessel must be so designed as to avoid blockage of the gas inlet by rapid separation of ferrous chloride. After saturation with hydrochloric acid gas, the liquor is cooled, and filtered through porous earthenware or vulcanite filters, and the crystals are washed as before with saturated ferrous chloride solution or with hydrochloric acid solution. The acid liquor freed from the crystals is now employed to attack a second quantity of the "mainly soluble" residue, the cycle being then repeated indefinitely as in the alternative method. The zinc concentrates in the mother liquor as before, and after such a number of cycles that the concentration reaches 100 grams per litre or other suitable proportion, the liquor is withdrawn for removal of zinc. The ferrous chloride remaining in this zinc-rich liquor may be removed by further concentration or by further saturation with hydrochloric acid gas, and the zinc-rich liquor refined and treated by electrolysis or precipitation or otherwise in known manner to yield a suitable zinc product.

The crystalline ferrous chloride separated from the solution is dried and heated in a rotating tube furnace or other suitable furnace to about 250° C. with free access of air, with or without use of steam; reaction proceeds very rapidly, and requires but little heat. Pure ferric oxide is delivered from the furnace whilst hydrochloric acid gas is evolved, drawn off through absorption towers or suitable absorption vessels, and taken again into the treatment cycle.

To sum up, by this cycle of operations most of the sulphur present in the pyrites is recovered; of 48 parts of sulphur per 100 parts of pyrites, about 16-18 parts of crude and 20 parts of pure sulphur are so obtained. The whole of the copper is separated as a rich concentrate, and practically the whole of the lead is separated as metal. The small quantities of silver and gold contained in the pyrites remain in the copper concentrate, and may be recovered therefrom in known manner. About one half of the zinc may be recovered from the solution in a desired form, and over ninety per cent of the iron is obtained as a very pure ferric oxide, which may be sintered in known manner to render it suitable for the blast furnace. As nearly all the hydrochloric acid employed is recovered for further use, only the small quantity which is lost in handling and in the recovery of zinc needs to be added.

I claim:

1. A process for the treatment of iron pyrites for the recovery of the elements therefrom, consisting in heating the pyrites in the absence of air to a temperature in the region of 700-900° C., treating the solid monosulphide residue so obtained with strong hydrochloric acid at elevated temperatures to give a solution containing ferrous chloride and the chlorides of zinc and lead, separating this solution from the solid residue, extracting lead as metal by electrolysis from the solution, separating ferrous chloride by crystallization from the solution, and heating the ferrous chloride so obtained in presence of air and moisture and recovering hydrogen chloride.

2. A process for the treatment of iron pyrites for the recovery of the elements therefrom, consisting in heating the pyrites in the absence of air to a temperature in the region of 700–900° C., treating the solid monosulphide residue so obtained with strong hydrochloric acid at elevated temperatures to give a solution containing ferrous chloride and the chlorides of zinc and lead, separating this solution from the solid residue, extracting lead as metal by electrolysis, separating crystalline ferrous chloride by saturating the solution with gaseous hydrogen chloride, removing the separated ferrous chloride, using the acid mother liquor for treatment of further quantities of monosulphide residue, and heating the separated ferrous chloride in presence of air and moisture and recovering hydrogen chloride.

3. A process for the treatment of iron pyrites for the recovery of the elements therefrom, consisting in heating the pyrites in the absence of air to a temperature in the region of 700–900° C., treating the solid monosulphide residue with ferrous chloride solution and hydrogen chloride at elevated temperatures, separating the solution from the solid residue, allowing the solution to cool, separating the crystalline ferrous chloride so formed, heating the ferrous chloride in the presence of air and moisture and recovering gaseous hydrogen chloride, extracting lead as metal from the solution by electrolysis and treating further quantities of the solid monosulphide residue with the ferrous chloride solution and hydrogen chloride so obtained.

4. A process for the treatment of iron pyrites for the recovery of the elements therefrom, consisting in heating the pyrites in the absence of air to a temperature in the region of 700–900° C., treating the solid monosulphide residue so obtained with strong hydrochloric acid at elevated temperatures to give a solution containing ferrous chloride and the chlorides of zinc and lead, separating this solution from the solid residue, extracting lead as metal by electrolysis, separating crystalline ferrous chloride by saturating the solution with gaseous hydrogen chloride, removing the separated ferrous chloride, using the acid mother liquor for treatment of further quantities of monosulphide residue, heating the separated ferrous chloride in presence of air and moisture and recovering hydrogen chloride, continuing the cyclic use of the mother liquor until zinc accumulates in the liquor, and removing the liquor so obtained.

5. A process for the treatment of iron pyrites for the recovery of the elements therefrom, consisting in heating pyrites in the absence of air to a temperature in the region of 700–900° C., treating the solid monosulphide residue with ferrous chloride solution and hydrogen chloride at elevated temperatures, separating the solution from the solid residue, allowing the solution to cool, separating the crystalline ferrous chloride so formed, heating the ferrous chloride in the presence of air and moisture and recovering gaseous hydrogen chloride, extracting lead as metal from the solution by electrolysis, treating further quantities of the solid monosulphide residue with the ferrous chloride solution and hydrogen chloride so obtained, continuing the cyclic use of the mother liquor until zinc accumulates in the liquor, and removing the liquor so obtained.

STANLEY ISAAC LEVY.